United States Patent
Otomo

(10) Patent No.: US 11,738,267 B2
(45) Date of Patent: Aug. 29, 2023

(54) PROGRAM AND INFORMATION PROCESSING DEVICE

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 0 days.

(21) Appl. No.: 17/338,162

(22) Filed: Jun. 3, 2021

(65) Prior Publication Data

US 2021/0370181 A1 Dec. 2, 2021

Related U.S. Application Data

(63) Continuation of application No. PCT/JP2019/046971, filed on Dec. 2, 2019.

(30) Foreign Application Priority Data

Dec. 3, 2018 (JP) ................... 2018-226379

(51) Int. Cl.
*A63F 13/00* (2014.01)
*A63F 13/58* (2014.01)
(Continued)

(52) U.S. Cl.
CPC .............. *A63F 13/58* (2014.09); *A63F 13/45* (2014.09); *A63F 13/69* (2014.09); *A63F 2300/609* (2013.01); *A63F 2300/65* (2013.01)

(58) Field of Classification Search
CPC .. G07F 17/3244; G07F 17/34; G07F 17/3295; G07F 17/326
See application file for complete search history.

(56) References Cited

U.S. PATENT DOCUMENTS

| 2016/0171827 | A1* | 6/2016 | Washington | ........ G07F 17/3227 463/16 |
|---|---|---|---|---|
| 2016/0171835 | A1* | 6/2016 | Washington | ........ G07F 17/3223 463/25 |
| 2017/0076553 | A1* | 3/2017 | Washington | .......... A63F 13/822 |

FOREIGN PATENT DOCUMENTS

JP 6296194 B1 3/2018

OTHER PUBLICATIONS

International Search Report issued in International Application No. PCT/JP2019/046971, dated Feb. 10, 2020 (7 pages).
(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

An information processing device includes a controller and a storage that stores: contents and a mission associated with a first content of the contents. The controller executes a game in which a parameter of a source content is increased when the source content having a source content ID is fused with a resource content having a resource content ID that is the same as the source content ID; upon receiving an instruction for the mission based on a player's operation, causes a screen to display a game discipline in which the first content can be acquired; when two or more first contents are acquired, determines: a second content of the acquired first contents as the source content; and third contents of the acquired first contents as the resource contents; and cause the screen to display a result in which the second content is automatically fused with the third contents.

11 Claims, 11 Drawing Sheets

(51) Int. Cl.
A63F 13/45 (2014.01)
A63F 13/69 (2014.01)

(56) References Cited

OTHER PUBLICATIONS

Written Opinion issued in International Application No. PCT/JP2019/046971, dated Feb. 10, 2020 (3 pages).

* cited by examiner

PROGRAM AND INFORMATION PROCESSING DEVICE

BACKGROUND

Technical Field

The present invention relates to an information processing device.

Conventional games are known in which a mission reward is given to a player when the player accomplishes a mission.

Regarding these types of games, Patent Document 1 discloses a technology for granting items and experience points as mission rewards when a player accomplishes (completes) a mission.

PATENT LITERATURE

Patent Document 1: Japanese Patent Publication No. 6296194

In some such games, the game operator sets a character to be trained by the player as a corresponding character for a mission, and the player is judged to have accomplished the mission when the parameters of the corresponding character reach a predetermined value. However, if it takes a lot of time and effort to increase the parameters of the corresponding character, players may hesitate to take on the challenge of the mission or abandon the mission midway.

SUMMARY

One or more embodiments provide a non-transitory computer-readable medium (CRM) that stores program instructions and an information processing device that can reduce the time and effort required to train a corresponding character for a mission.

According to one or more embodiments, a CRM stores program instructions that cause a computer to execute a game program in which the parameters of a fusion source content are increased by fusing the same content, as a resource, with the fusion source content. The program instructions cause the computer to function as: a granting means for granting a reward to a player when a parameter of a corresponding content that corresponds to a mission reaches a predetermined value; a control means for advancing a game discipline in which the corresponding content can be acquired based on mission instructions from the player; and when the player has acquired a plurality of corresponding contents based on said advancement, a fusion means for automatically fusing one of the corresponding contents, from among a plurality of acquired corresponding contents, as the fusion source and the remaining corresponding contents as resources.

The "computer" described above may comprise a single computer or a plurality of computers.

According to one or more embodiments, since one of the corresponding contents among the plurality of acquired corresponding contents is automatically fused as the fusion source and the remaining corresponding contents are fused as resources, it is possible to reduce the time and effort required for a player to go to the enhancement fusion menu after acquiring corresponding contents to fuse. This can provide the player with motivation to train using the corresponding content for the mission.

In one or more embodiments, the fusion means automatically fuses the possessed corresponding contents as the fusion source and the corresponding contents acquired based on said advancement as resources when the player already possesses the corresponding contents.

According to one or more embodiments, the CRM stores program instructions of a game in which the parameters of a fusion source content are increased by fusing same-family contents, as resources, with the fusion source content. The program instructions cause a computer to function as: a granting means for granting a reward to a player when a parameter of a corresponding content that corresponds to a mission reaches a predetermined value; a control means for advancing a game discipline in which pre-evolution content of the corresponding content can be acquired based on mission instructions from the player; and when the player has acquired a plurality of pre-evolution contents based on said advancement, a fusion means for, after automatically evolving one of the pre-evolution contents from among the plurality of acquired pre-evolution contents into the corresponding content, automatically fusing said corresponding content as the fusion source and the remaining pre-evolution contents as resources.

According to one or more embodiments, the CRM stores program instructions of a game in which the parameters of a fusion source content are increased by fusing same-family contents, as resources, with the fusion source content. The program instructions cause a computer to function as: a granting means for granting a reward to a player when a parameter of a corresponding content that corresponds to a mission reaches a predetermined value; a control means for advancing a game discipline in which the pre-evolution content of the corresponding content can be acquired based on mission instructions from the player; and when the player has acquired a plurality of pre-evolution contents based on said advancement, a fusion means for automatically fusing one of the pre-evolution contents, from among a plurality of acquired pre-evolution contents, as the fusion source and the remaining pre-evolution contents as resources.

In one or more embodiments, when the player already possesses the corresponding content, the fusion means automatically fuses the possessed corresponding content as the fusion source and the acquired pre-evolution contents based on said advancement as resources.

In one or more embodiments, when the player already possesses the pre-evolution content, the fusion means automatically fuses the corresponding content as the fusion source and the acquired pre-evolution contents based on said advancement as resources after automatically evolving the possessed pre-evolution content into the corresponding content.

In one or more embodiments, when the player already possesses the pre-evolution content, the fusion means automatically fuses possessed pre-evolution content as the fusion source and the acquired pre-evolution contents based on said advancement as resources.

In one or more embodiments, the fusion means automatically evolves the pre-evolution content that was used as the fusion source into the corresponding content, following said automatic fusion.

An information processing device according to one or more embodiments executes a game in which the parameters of a fusion source content are increased by fusing the same content, as a resource, with the fusion source content. The information processing device includes: a granting means for granting a reward to a player when a parameter of a corresponding content that corresponds to a mission reaches a predetermined value; a control means for advancing a game discipline in which the corresponding content can be acquired based on mission instructions from the player; and when the player has acquired a plurality of corresponding contents based on said advancement, a fusion means for automatically fusing one of the corresponding contents, from among a plurality of acquired corresponding contents, as the fusion source and the remaining corresponding contents as resources.

An information processing device according to one or more embodiments executes a game in which the parameters of a fusion source content are increased by fusing same-family contents, as resources, with the fusion source content. The information processing device includes: a granting means for granting a reward to a player when a parameter of a corresponding content that corresponds to a mission reaches a predetermined value; a control means for advancing a game discipline in which pre-evolution content of the corresponding content can be acquired based on mission instructions from the player; and when the player has acquired a plurality of pre-evolution contents based on said advancement, a fusion means for, after automatically evolving one of the pre-evolution contents from among the plurality of acquired pre-evolution contents into the corresponding content, automatically fusing said corresponding content as the fusion source and the remaining pre-evolution contents as resources.

The information processing device according to one or more embodiments executes a game in which the parameters of a fusion source content are increased by fusing same-family contents, as resources, with the fusion source content. The information processing device includes: a granting means for granting a reward to a player when a parameter of a corresponding content that corresponds to a mission reaches a predetermined value; a control means for advancing a game discipline in which the pre-evolution content of the corresponding content can be acquired based on mission instructions from the player; and when the player acquired a plurality of pre-evolution contents based on said advancement, a fusion means for automatically fusing one of the pre-evolution contents, from among the plurality of acquired pre-evolution contents, as the fusion source and the remaining pre-evolution contents as resources.

According to one or more embodiments, an information processing device includes a controller and a storage that stores contents owned by a player and a mission associated with a first content of the contents. Each of the contents has a content ID and a parameter. The controller executes a game in which a parameter of a source content is increased when the source content having a source content ID is fused with a resource content having a resource content ID that is the same as the source content ID; upon receiving an instruction for the mission based on a player's operation, causes a screen to display a game discipline in which the first content can be acquired by the player; when two or more first contents are acquired in the game disciplines, determines: a second content of the acquired first contents as the source content; and third contents of the acquired first contents as the resource contents; and cause the screen to display a result in which the second content is automatically fused with the third contents.

One or more embodiments makes it possible to improve game user's convenience in a field of video game technologies to reduce the time and effort required to train the corresponding content for a mission.

DETAILED DESCRIPTION

The following is an explanation of an embodiment of the present invention (hereinafter referred to as the "present embodiment") with reference to the accompanying drawings. In order to facilitate understanding of the explanation, the same codes are applied to the same components and steps in each drawing as far as possible, and redundant explanations are omitted.

Figure 1:
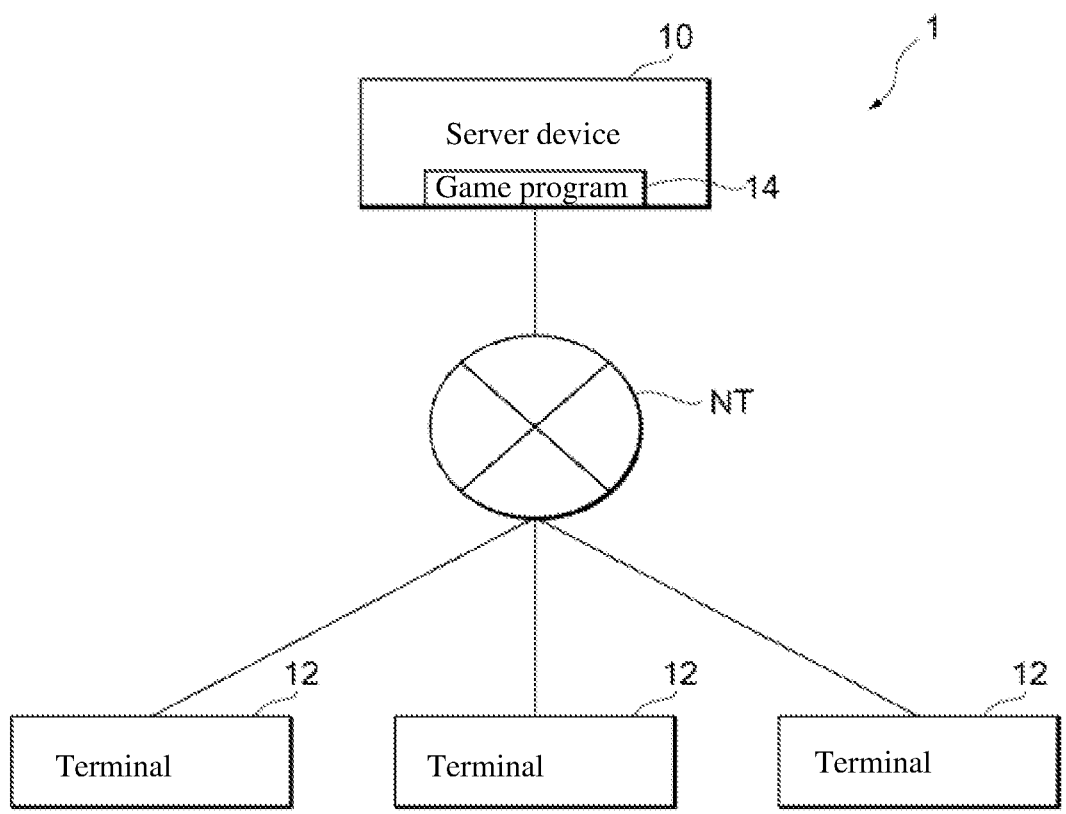
FIG. 1 is a block diagram illustrating an example of the overall configuration of a game system that includes the information processing device (computer) according to one or more embodiments.

FIG. 1 is a block diagram illustrating an example of the overall configuration of a game system 1 that includes the information processing device (computer) according to one or more embodiments.

As illustrated in FIG. 1, the game system 1 is a system for providing a game to one or more players. The game system 1 is provided with a server device 10 as an information processing device and one or more terminal devices 12 according to one or more embodiments. The server device 10 and terminal devices 12 are connected to each other for mutual communication via a communication network NT such as an intranet or the Internet.

The server device 10 is an information processing device that provides a game obtained by executing a game program 14, or the game program 14 itself, to each terminal device 12 via the communication network NT. In one or more embodiments, the server device 10 provides a game to each terminal device 12 by executing the game program 14 and transmitting and outputting the execution results (image data, audio data, and the like) to each terminal device 12. In other words, the server device 10 causes a screen of the terminal device to display a screen of the game. The game program 14 may be cooperatively executed by the terminal devices 12 and the server device 10.

Each terminal device 12 is an information processing device owned by a player that provides a game to the player by outputting the execution results of the game program 14 received from the server device 10. These terminal devices 12 can include a variety of video game consoles, portable game consoles, arcade game consoles, smartphones, tablets, personal computers, and the like. Each terminal device 12 is connectable to the server device 10 via the communication network NT. Each terminal device 12 may provide a game to a player by downloading a game program 14 from the server device 10 and executing the game program 14 therein.

Figure 2:
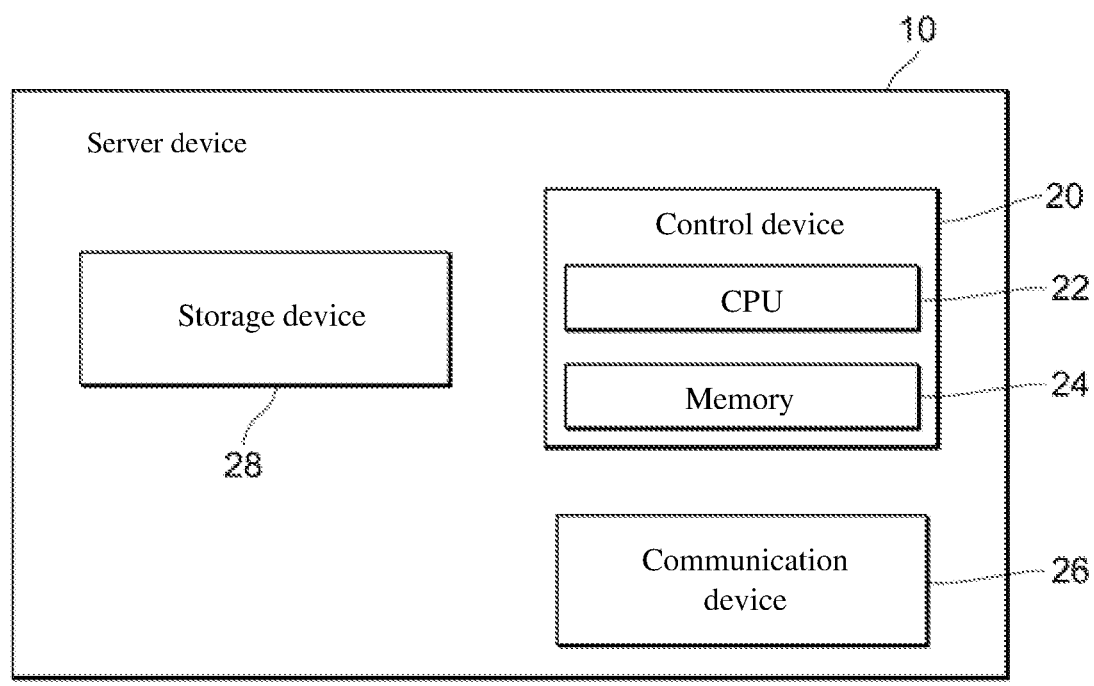
FIG. 2 is a diagram schematically illustrating an example of the hardware configuration of the server device.

FIG. 2 is a diagram schematically illustrating an example of the hardware configuration of the server device 10.

As illustrated in FIG. 2, the server device 10 is provided with a control device 20 (i.e., controller), a communication device 26 (i.e., transceiver), and a storage device 28 (i.e., storage). The control device 20 consists mainly of a CPU (Central Processing Unit) 22 and memory 24.

In the control device 20, the CPU 22 functions as various functional means by executing a predetermined program stored in the memory 24 or a storage device 28 or the like. The details of this functional means will be described below.

The communication device 26 is made up of a communication interface or the like for communicating with an external device. The communication device 26, for example, transmits and receives various types of information (e.g., instructions for the game based on the player's operation) to and from the terminal devices 12.

The storage device 28 is made up of a hard disk or the like. The storage device 28 stores various programs and various information necessary for execution of processes in the control device 20, including the game program 14, and information regarding processing results.

Note that the server device 10 can be realized using an information processing device such as a dedicated or general-purpose server or computer. The server device 10 may be made up of a single information processing device or a plurality of information processing devices distributed over the communication network NT. In addition, FIG. 2 illustrates only a portion of the main hardware configuration that the server device 10 is made up of, and the server device 10 can be equipped with other configurations that servers generally have. The hardware configuration of the plurality of terminal devices 12 can also be similar to that of the server device 10, for example, except that they are provided with operation means, a display device, and a sound output device.

<Game Overview>

Games according to one or more embodiments are games that can be executed such that it is possible to acquire a character as an example of content, such as a lottery game (loot box game), a quest (battle game), or a mission. A mission may also be referred to as a quest.

A lottery game according to one or more embodiments is a game in which a player acquires one or more characters randomly selected from a group of characters to be drawn following an instruction (request) from the player to execute a lottery game. This lottery is executed based on the consumption of credits by the player. Credits can include, for example, paid items or game items other than paid items (non-paid items, tickets, game coins, and the like). Paid items are game items that are granted based on the player's payment (payment of money, credits, and the like). In addition, non-paid items are game items that have the same value as paid items and are mainly granted in the game.

A quest according to one or more embodiments is a game in which an enemy character is pitted against a deck consisting of one or more characters possessed by the player, based on instructions (requests) from the player to execute the quest. The player controls each of the characters that make up the deck (characters in the deck) to play the battle game, and if the player completes the quest, the player is granted a completion reward. Completion rewards include non-paid items, game coins, enemy characters that appeared in the quest, and experience points to increase the player's rank.

Missions according to one or more embodiments are games that grant mission rewards to players based on their having played the game and other factors. A specific mission is a mission to make the parameters of a specific character (the corresponding character (i.e., first content)) reach a predetermined value. A parameter here is a parameter that is changed (increased) by fusing a character of the same family as the fusion source character, as a resource, with the fusion source character. Examples include skill level, rarity, and the like. Note that a character of the same family as the character includes characters with the same character ID, or a pre-evolution version and an evolved version of the character. For example, a character K and a character M, which is the character K having evolved twice, are in the same family. For example, the game according to one or more embodiments may be a game in which a parameter of a source content is increased when the source content having a source content ID is fused with a resource content having a resource content ID that is a same as the source content ID. For example, the game may be a game in which a parameter of a source content is increased when the source content having a source content ID is fused with a resource content having a resource content ID, and the source content ID and the resource content ID are associated with a same family ID.

Mission rewards include characters, game items excluding paid items, a privilege to purchase game items or execute special quests, a privilege to unlock the evolution of a particular character, and coupons to receive items at actual stores such as convenience stores and restaurants and the like (barcodes, gift codes, and the like). Mission rewards may be randomly determined according to a predetermined probability at the time of mission accomplishment.

<Functional Means>

Figure 3:
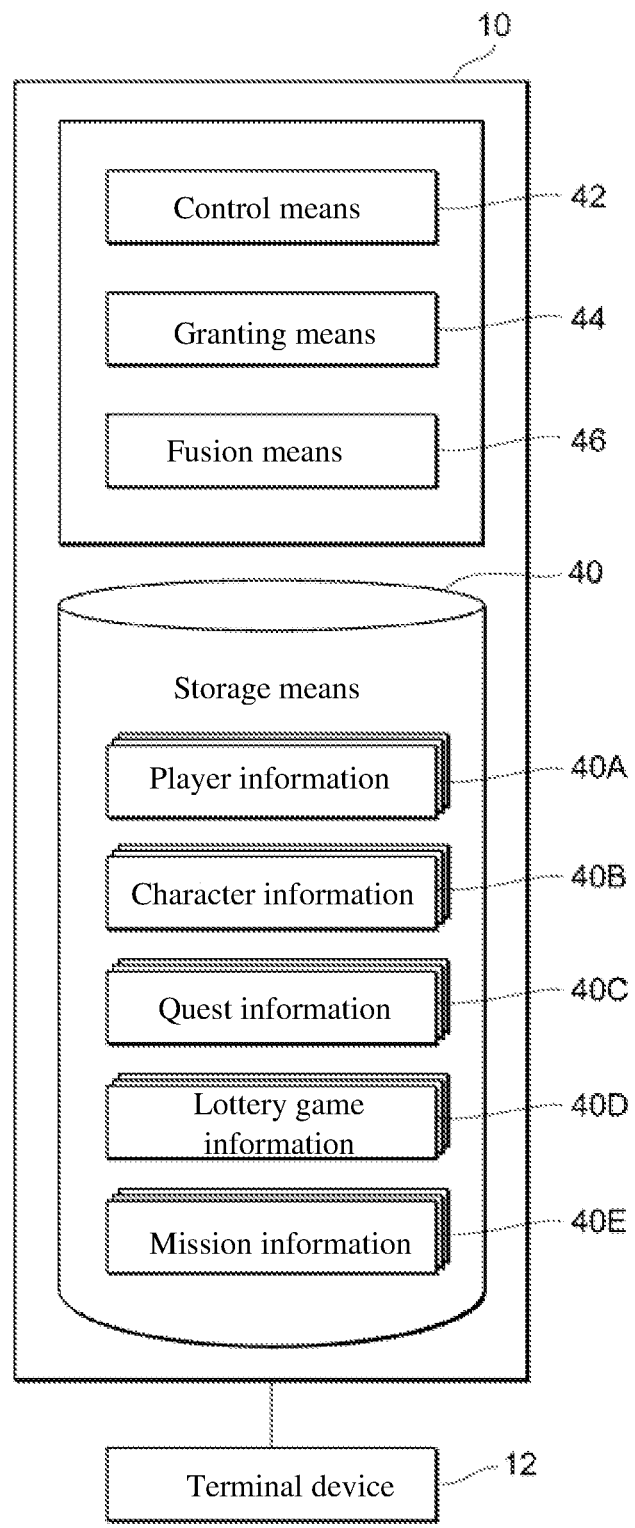
FIG. 3 is a block diagram schematically illustrating an example of the functional means of the server device.

FIG. 3 is a block diagram schematically illustrating an example of the functional means of the server device 10.

As illustrated in FIG. 3, the server device 10 is provided with functional means such as a storage means 40, a control means 42, a granting means 44, and a fusion means 46. The storage means 40 is realized by one or more storage devices 28. Functional means other than the storage means 40 are realized by the control device 20 executing the game program 14 stored in the storage device 28 or the like. All or some of these functional means 40 to 46 may be provided in the terminal device 12. The server device 10 need only be connectable to the storage means 40, and may be connected either internally to the server device 10 or externally to the server device 10, as described above. In other words, the server device 10 itself need not be provided with the storage means 40. In this case, the storage means 40 is provided in another server device or the like. It goes without saying that the storage means 40 may calculate coefficients and various variables on the stored data and output them when there is a request to refer to or acquire some data.

The storage means 40 has the function of storing player information 40A for each player, character information 40B for each character, quest information 40C for each quest, lottery game information 40D for each lottery game, mission information 40E for each mission, and the like.

Player information 40A is data in which a variety of information pertaining to a player is described. In one or more embodiments, the player information 40A describes the player name, player rank, possessed character information, current stamina value, possessed item information, and mission achievement information, in association with the player ID. The possessed character information describes the various parameters of the ability parameters (level, skill level, hit points, attack power, defense power, and the like) of each character as character information possessed by the player, and the date and time of acquisition. Current stamina value is a value that is consumed when a player executes a quest, and is recovered by using stamina recovery items (paid items, non-paid items, and the like) and by the passage of time. Possessed items information describes the number of paid items, non-paid items, game coins and other game items possessed by the player. The mission achievement information describes the mission ID of the mission that the player has accomplished.

The character information 40B is data that describes various information about the characters appearing in the game. In one or more embodiments, the character information 40B describes the character name, character image, rarity, initial and maximum values of ability parameters, skills, and evolution fusion information, in association with the character ID (content ID). For example, a character with a rarity of 4 has a description of having a maximum skill level 8, and a character with a rarity of 5 has a description of having a maximum skill level 10. A skill is an ability that a character can activate during or after the game. In one or more embodiments, a skill is, for example, an ability to make an item appear that recovers hit points during a game, an ability to reduce the amount of damage caused by an attack from an enemy character, an ability to increase the number of characters that can be acquired after a game, and the like. The higher the skill level, the higher the activation probability and the activation effect. Evolution fusion information describes one or more evolution resource characters associated with the character (fusion source character) and the character ID after the evolution.

Quest information 40C is data describing a variety of information pertaining to a quest. In one or more embodiments, quest information 40C describes the quest name, enemy character information, and stamina consumption value, in association with the quest ID. Enemy character information describes the ability parameters, drop rates, experience values, and the number of game coins in association with the character ID of each enemy character that appears in the quest. Drop rate is the probability that the player will acquire an enemy character as a reward for completing a quest, with the probability being set to be higher as the quest difficulty rises. Experience value and the number of game coins are values that are earned by players as rewards for completing a quest. Stamina consumption value is a value that is consumed from the player's current stamina value when the player executes a quest, with the value being set to be higher as the quest difficulty rises.

Lottery game information 40D is data describing a variety of information pertaining to the lottery game. In one or more embodiments, the lottery game information 40D describes the lottery game name, lottery target information, number of acquired characters, and credits in association with the lottery game ID. The lottery target information describes the lottery probabilities in associated with the character IDs of the characters that are the lottery targets in the lottery game (lottery target characters). The number of acquired characters describes the number of characters to be acquired by the player when the lottery game is executed one time. Credits include the number of game items, such as paid items and non-paid items, that are required to execute the lottery game. In addition, a higher number of credits is set for lottery games having a large number of acquired characters or in which characters with high rarity can be easily acquired.

Mission information 40E is data in which a variety of information pertaining to the mission is described. In one or more embodiments, the mission information 40E describes the mission summary, accomplishment conditions, mission reward, and mission period, in association with the mission ID. The mission summary describes the text that appears on the selection screen when selecting a mission. The accomplishment condition describes the corresponding character IDs and the attainment level. The corresponding character ID describes the character ID of the corresponding character that corresponds to the mission. The corresponding character is determined by the game operator. The attainment level describes the skill level (predetermined value) that the corresponding character can attain, which is a mission accomplishment condition. The mission reward describes content items and the number thereof granted to the player when the player accomplishes the mission. The mission period describes the period during which the mission can be executed. The mission period could be, for example, 0:00 on November 10 to 23:59 on November 16, or a value (for example, NULL) that indicates that the mission can be executed at any time.

The control means 42 has a function to execute a game in response to an operation of a player on the terminal device 12. In one or more embodiments, the control means 42 advances a game discipline (quest or lottery game) in which the corresponding character or the like for the mission can be acquired based on a challenge request (instruction) for the mission from the player.

The granting means 44 has a function to grant a mission reward to a player who has accomplished a mission. In one or more embodiments, the granting means 44 grants a mission reward to the player when the skill level of the corresponding character corresponding to the mission reaches a predetermined value (attainment level). In other words, the control device 20 determines whether a parameter of the corresponding character (first content) reaches a predetermined value. If the control device 20 determines that the parameter of the first content reaches a predetermined value, the control device 20 causes the storage device 28 to store a reward to be granted to the player.

The fusion means 46 has a function of manual fusion based on operations by the player or automatic fusion to fuse characters automatically. In one or more embodiments, the fusion means 46 performs, as a first character fusion, an enhancement fusion in which one or more resource characters are fused with the fusion source character to change the ability parameters of the fusion source character. Here, the fusion means 46 performs an enhancement fusion that changes (increases) the skill level of at least the fusion source character when the fusion source character and the resource character are characters of the same family. If the fusion source character and the resource character are not of the same family, the fusion means 46 performs the enhancement fusion to change (increase) the level of at least the fusion source character, but not the skill level.

The fusion means 46 performs, as a second character fusion, an evolution fusion to evolve the fusion source character into a different character, provided that the player possesses evolution resource characters associated with the fusion source character. In one or more embodiments, the fusion means 46 sets the skill level of the fusion source character (the pre-evolution character) to the skill level of the character after evolution when the evolution fusion is performed.

In addition, the fusion means 46 sets the character used as a resource (resource character) in the first character fusion or the second character fusion to non-possessed character by the player. In the case where the first character fusion is performed based on operation of the player, the fusion means 46 performs an enhancement fusion to the fusion source character with the resource character as the resource based on the enhancement fusion menu selection, designation of the fusion source character and the resource character, and receipt of the enhancement fusion instruction from the player. When the second character fusion is performed based on operation of the player, the fusion means 46 performs evolution fusion using all the evolution resource characters associated with the fusion source character as resources based on the evolution fusion menu selection, designation of the fusion source character, and the receipt of the evolution fusion instruction from the player.

<Process Flow for Each Functional Means>

Figure 4:
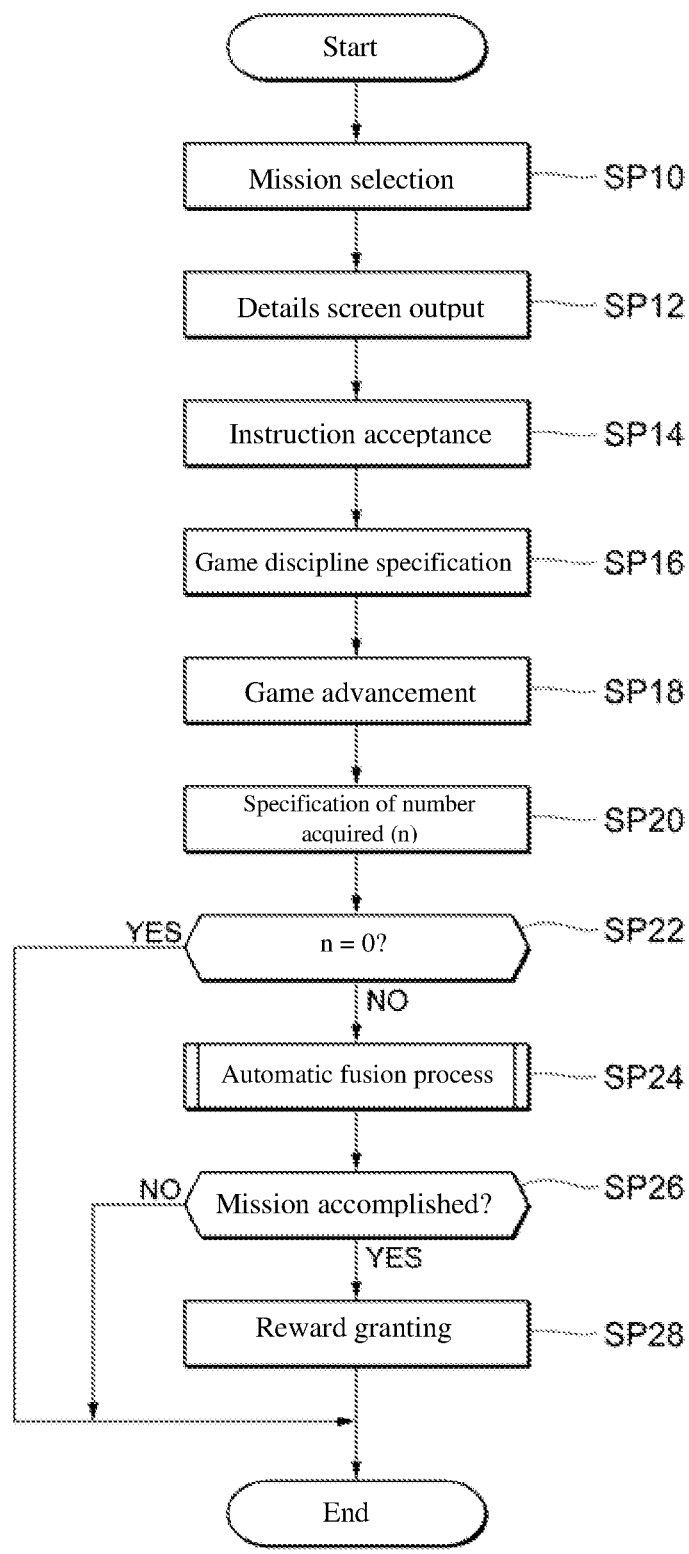
FIG. 4 is a flowchart illustrating an example of the flow of processes related to a mission executed by each functional means according to one or more embodiments.

FIG. 4 is a flowchart illustrating an example of the process flow related to a mission executed by each functional means according to one or more embodiments. This process is started, for example, when a player selects the mission menu on the home screen. The order and content of the following steps may be changed as appropriate.

(Step SP10)

The control means 42 outputs (displays) a mission selection screen to the terminal device 12 for selecting one or more missions. In one or more embodiments, the control means 42 obtains missions that the player has not yet accomplished and can execute by referring to the player information 40A and the mission information 40E, and outputs a mission selection screen including a mission summary for each mission to the terminal device 12. In this mission selection screen, in response to the selection (operation instruction) of a mission from a player, processing moves to step SP12.

(Step SP12)

The control means 42 outputs (displays) to the terminal device 12 a mission details screen showing the details of the mission selected in the above step SP10. In one or more embodiments, the control means 42 obtains the accomplishment conditions and the mission reward of the selected mission by referring to the mission information 40E, and outputs a mission details screen based on these to the terminal device 12.

Figure 6:
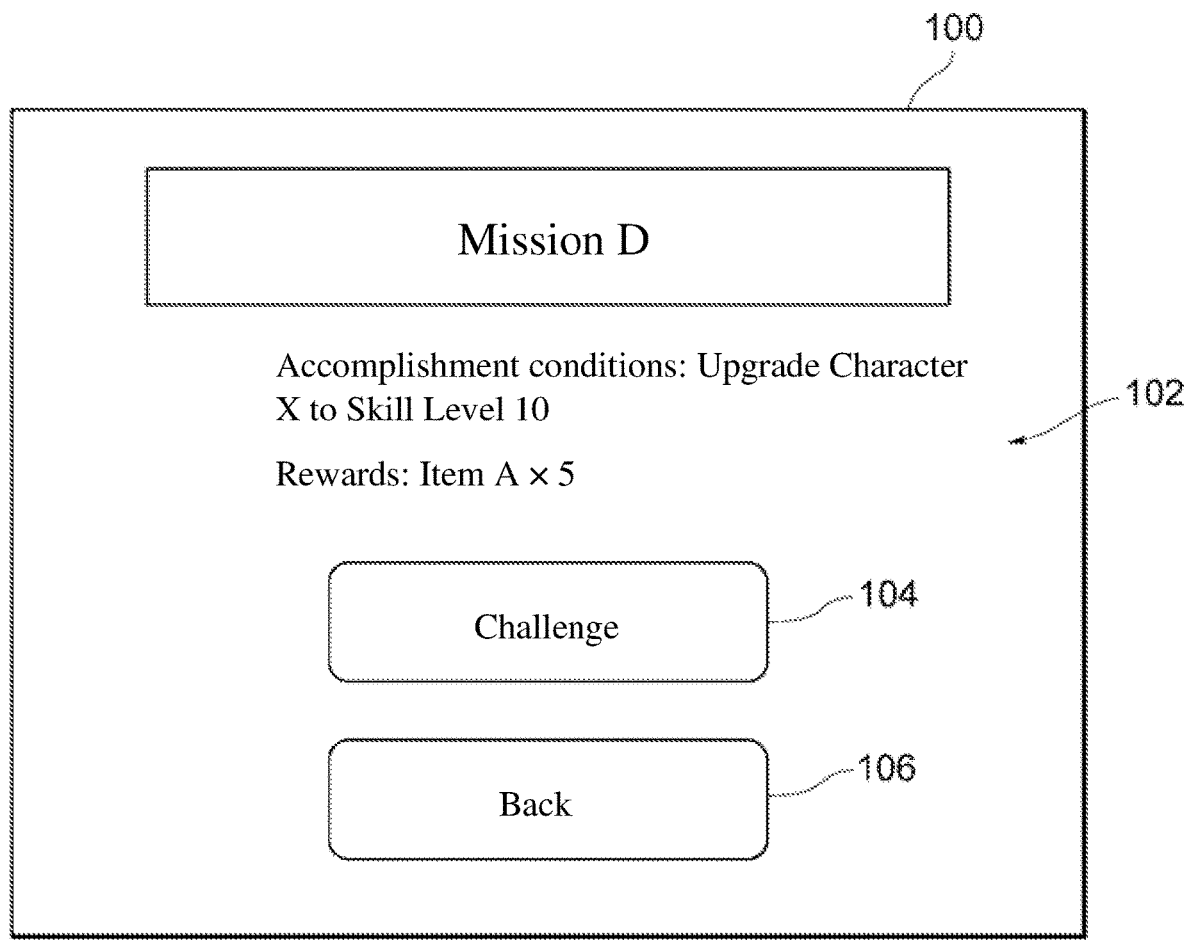
FIG. 6 is a diagram illustrating an example of the mission details screen output to a terminal device.

FIG. 6 is a diagram illustrating an example of a mission details screen 100 output to a terminal device 12.

As illustrated in FIG. 6, the mission details screen 100 has a mission information region 102, a challenge button 104, and a back button 106. In the mission information region 102, images showing the corresponding character (character X) for the mission, the accomplishment conditions indicating the attainment level (skill level), and the mission reward are arranged. If the challenge button 104 is pressed, the screen transitions to a screen for executing a game discipline in which the corresponding character can be acquired. If the back button 106 is pressed, the screen transitions to the mission selection screen.

Returning to FIG. 4, after outputting the mission details screen 100 to the terminal device 12, processing moves to step SP14.

(Step SP14)

The control means 42 accepts the fact the challenge button 104 is pressed (instruction) by the player on the above-mentioned mission details screen 100. Then, in response to the challenge button 104 being pressed, processing moves to step SP16.

(Step SP16)

The control means 42 specifies the game discipline that the corresponding character for the mission for which the challenge button 104 is pressed (instruction) can acquire. In one or more embodiments, the control means 42 specifies the game discipline (quest or lottery game) in which the corresponding character for the mission can be acquired by referring to the quest information 40C and the lottery game information 40D. Then, processing moves to step SP18.

(Step SP18)

The control means 42 advances the game discipline specified in step SP16 above. In one or more embodiments, if the specified game discipline is a quest, the control means 42 accepts a selection of a deck to be used in the quest from the player, consumes a portion of the player's current stamina value, and advances a battle game in which the selected deck (characters in the deck) and enemy characters appear. Meanwhile, if the specified game discipline is a lottery game, the control means 42 consumes game items (paid items, non-paid items, game coins, and the like) possessed by the player to advance the lottery game. Then, processing moves to step SP20.

(Step SP20)

The control means 42 specifies a number n (n is an integer greater than or equal to 0) of corresponding characters to be acquired by the player based on the progress of the game discipline. In one or more embodiments, when the game discipline that was advanced is a quest, the control means 42 determines characters to be acquired by the player based on the drop rate of the enemy characters that have appeared and the skill level of the characters in the deck, and specifies a number n of corresponding characters included in the determined characters. Meanwhile, if the game discipline that was advanced is a lottery game, the control means 42 determines characters to be acquired by the player based on the lottery probability for each of the lottery target characters and the number of acquired characters, and specifies a number n of corresponding characters included in the determined characters. Then, processing moves to step SP22.

(Step SP22)

The control means 42 determines whether the number n of acquired corresponding characters specified in the above step SP20 is 0 or not. If the determination is positive, processing ends the series of processes illustrated in FIG. 4. If the determination is negative, processing moves to step SP24.

(Step SP24)

The fusion means 46 performs an automatic fusion process with the corresponding character acquired by the player. This detailed process (subroutine) will be described later using FIG. 5. Then, processing moves to step SP26.

(Step SP26)

The control means 42 determines whether or not the mission selected in step SP10 above has been accomplished. In one or more embodiments, the control means 42 obtains the accomplishment conditions of the selected mission by referring to the mission information 40E, and determines whether the skill level of the corresponding character has reached the attainment level. If the determination is positive, processing moves to step SP28. If the determination is negative, processing ends the series of processes illustrated in FIG. 4.

(Step SP28)

The granting means 44 grants a mission reward to the player. In one or more embodiments, the granting means 44 obtains the mission reward of the accomplished mission by referring to the mission information 40E and grants the mission reward to the player. The control means 42 describes the mission ID of the accomplished mission in the mission achievement information of the player information 40A. Processing then ends the series of processes illustrated in FIG. 4.

Process Flow According to Step SP24

Working Example 1

Figure 5:
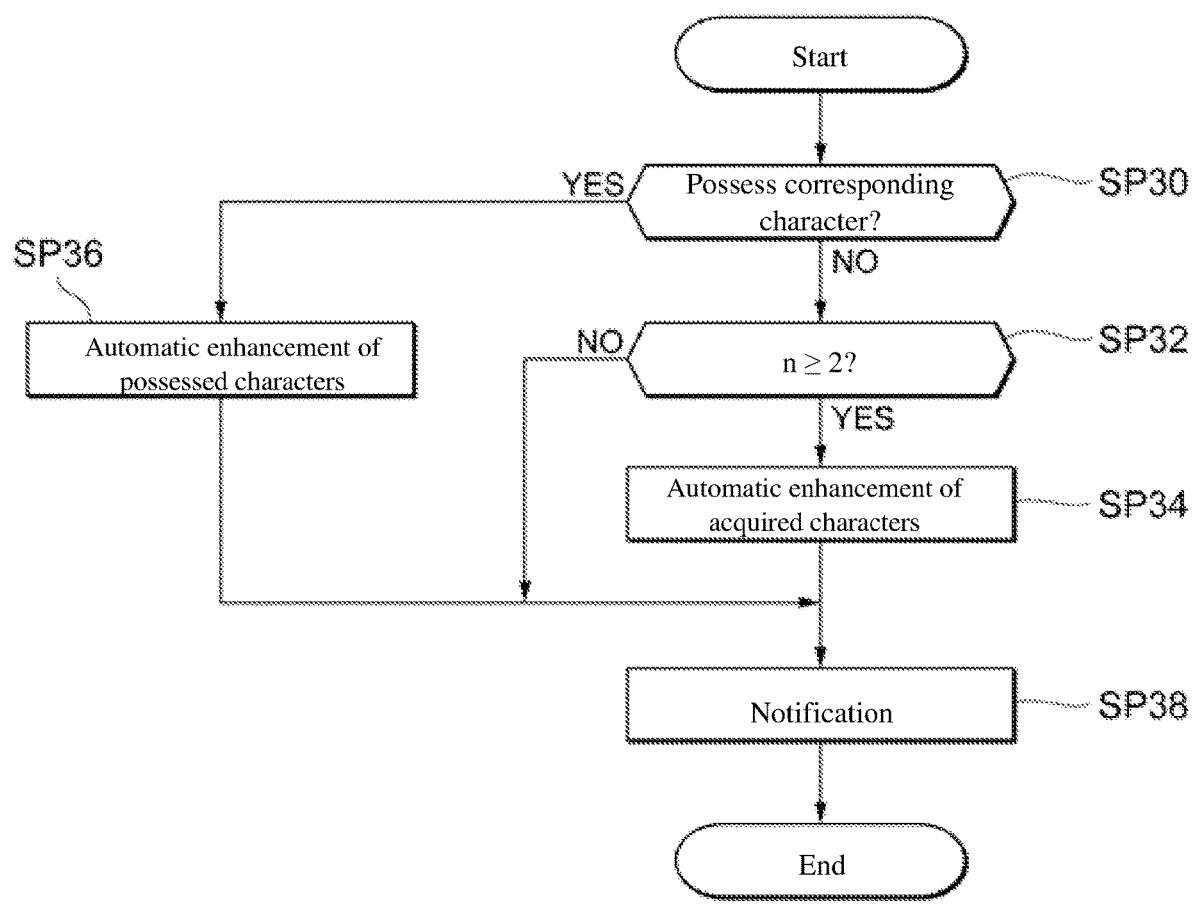
FIG. 5 is a flowchart illustrating an example of the flow of the automatic fusion process according to step SP24 (working example 1) as illustrated in FIG. 4.

FIG. 5 is a flowchart illustrating an example of the flow of the automatic fusion process according to step SP24 (Working Example 1) as illustrated in FIG. 4.

(Step SP30)

The control means 42 determines whether or not the player already possesses the corresponding character. In one or more embodiments, the control means 42 determines whether the player possesses the corresponding character by referring to the possessed character information in the player information 40A. If the determination is positive, processing moves to the step SP36. If the determination is negative, processing moves to step SP32.

(Step SP32)

The control means 42 determines whether the number n of acquired corresponding characters specified in the above step SP20 is 2 or more. If the determination is positive, processing moves to step SP34. If the determination is negative, processing moves to step SP38.

(Step SP34)

The fusion means 46 performs automatic enhancement (automatic enhancement fusion) among a plurality of corresponding characters acquired by the player. In other words, the fusion means 46 automatically enhances one of the acquired corresponding characters (one corresponding character) as the fusion source and the remaining corresponding characters (n−1 corresponding characters) as resource characters. In addition, the fusion means 46 increases the skill level of one corresponding character and causes it to be a possessed character of a player and the remaining corresponding characters to be non-possessed characters of the player by this automatic enhancement. Then, processing moves to step SP38.

(Step SP36)

The fusion means 46 performs automatic enhancement (automatically enhances and fuses) using one corresponding character already possessed by the player as the fusion source and all acquired corresponding characters as resources. In addition, the fusion means 46 increases the skill level of one corresponding character (one corresponding character) that is already possessed by the player and causes all acquired corresponding characters (n number of corresponding characters) to be non-possessed characters of the player by this automatic enhancement. Here, if the player already possesses two or more corresponding characters, the fusion means 46 uses the corresponding character with the oldest acquisition date and time (one character) as the fusion source for the automatic enhancement. Then, processing moves to step SP38.

(Step SP38)

The control means 42 outputs (displays) to the terminal device 12 a notification screen showing the acquired corresponding character and the fact that automatic enhancement (automatic enhancement fusion) has been performed.

As described above, when two or more corresponding contents are acquired in the game disciplines, the control device 20 determines one (second content) of the acquired corresponding characters (first contents) as a fusion source content and the remaining characters (third contents) of the acquired corresponding characters (first contents) as fusion resource contents. The control device 20 causes a screen of the terminal device 12 to display a result in which one (second content) of the acquired corresponding characters is automatically fused with the remaining characters (third contents).

Figure 7:
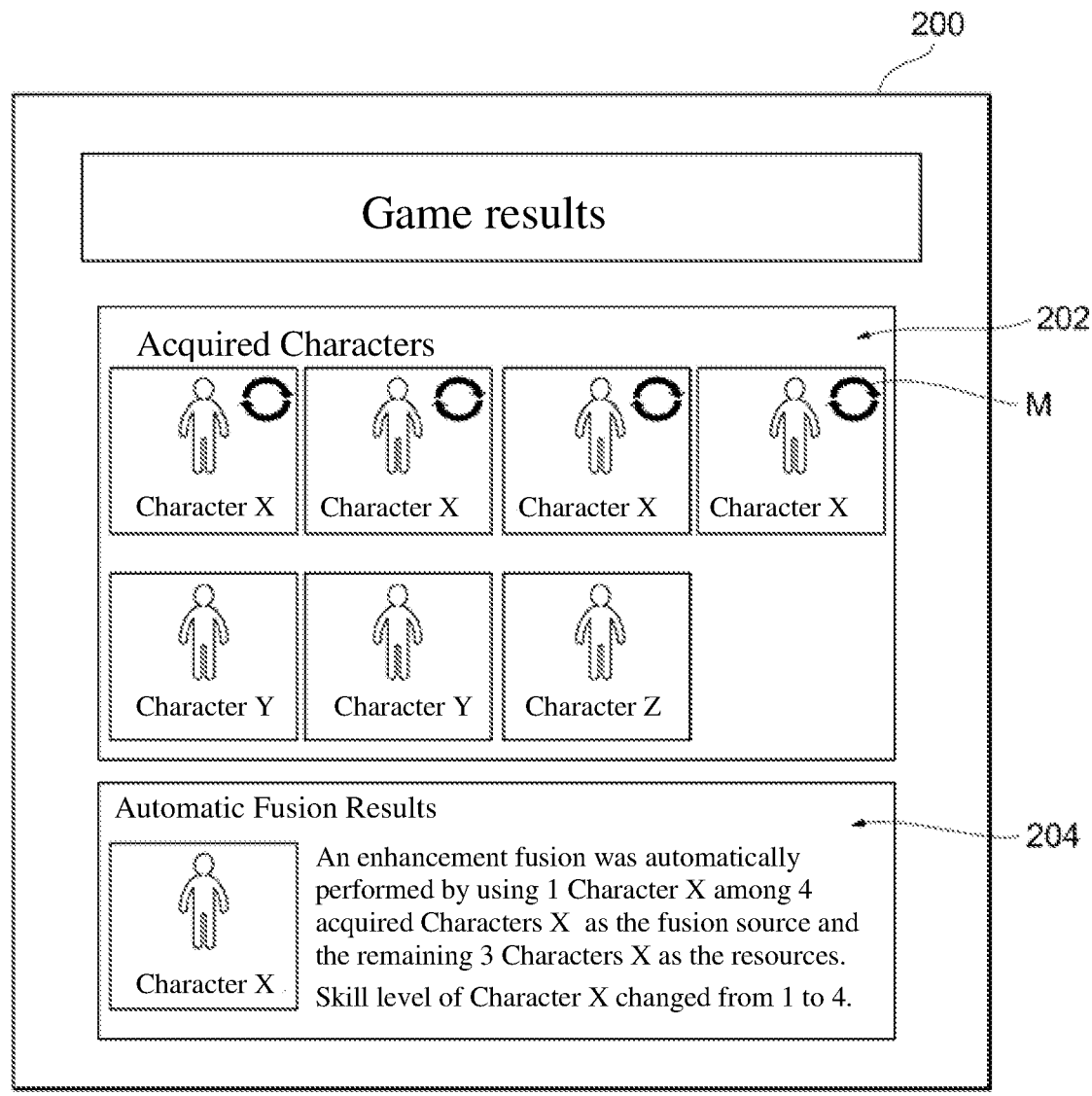
FIG. 7 is a diagram illustrating an example of a notification screen output to a terminal device (working example 1).

FIG. 7 is a diagram illustrating an example of a notification screen 200 output to the terminal device 12 (Working Example 1).

As illustrated in FIG. 7, the notification screen 200 has an acquired character information region 202 and an automatic fusion information region 204. Images of characters acquired by the player are arranged in the acquired character information region 202. The automatic fusion information region 204 shows the results of the automatic enhancement executed.

Here, four characters X (corresponding characters), two characters Y, and one character Z acquired by the player are arranged in the acquired character information region 202. In addition, in the acquired character information region 202, a marking M is attached to a total of four characters X that have been automatically enhanced.

In addition, the automatic fusion information region 204 shows that the automatic enhancement fusion (automatic enhancement) was performed by using one of the acquired characters X as the fusion source and the remaining three characters X as the resource as well as that the skill level of the character X used as the fusion source was changed (increased) by the automatic enhancement.

If the player already possessed a character X, the automatic fusion information region 204 shows that the automatic enhancement fusion (automatic enhancement) was performed using the character X already possessed as the fusion source and all the acquired corresponding characters as resources.

After outputting the above notification screen 200 to the terminal device 12, processing ends the series of processes illustrated in FIG. 5.

Working Example 2

In the above-described Working Example 1, in step SP16, a game discipline in which the player is to acquire a corresponding character is specified as an example, but the control means 42 can also specify a game discipline in which the player is to acquire a pre-evolution character of the corresponding character (hereinafter referred to as the "pre-evolution character"). In this case, the player must go to the evolution fusion menu to perform evolution fusion using the acquired pre-evolution character as the fusion source for the evolution fusion and the associated evolution resource character as the resource to accomplish the mission. Therefore, the control means 42 may automatically evolve and fuse (automatic evolution) said pre-evolution character in the automatic fusion process of step SP24 above. In this case, in step SP20 above, the control means 42 shall specify the number n of acquired pre-evolution characters.

Figure 8:
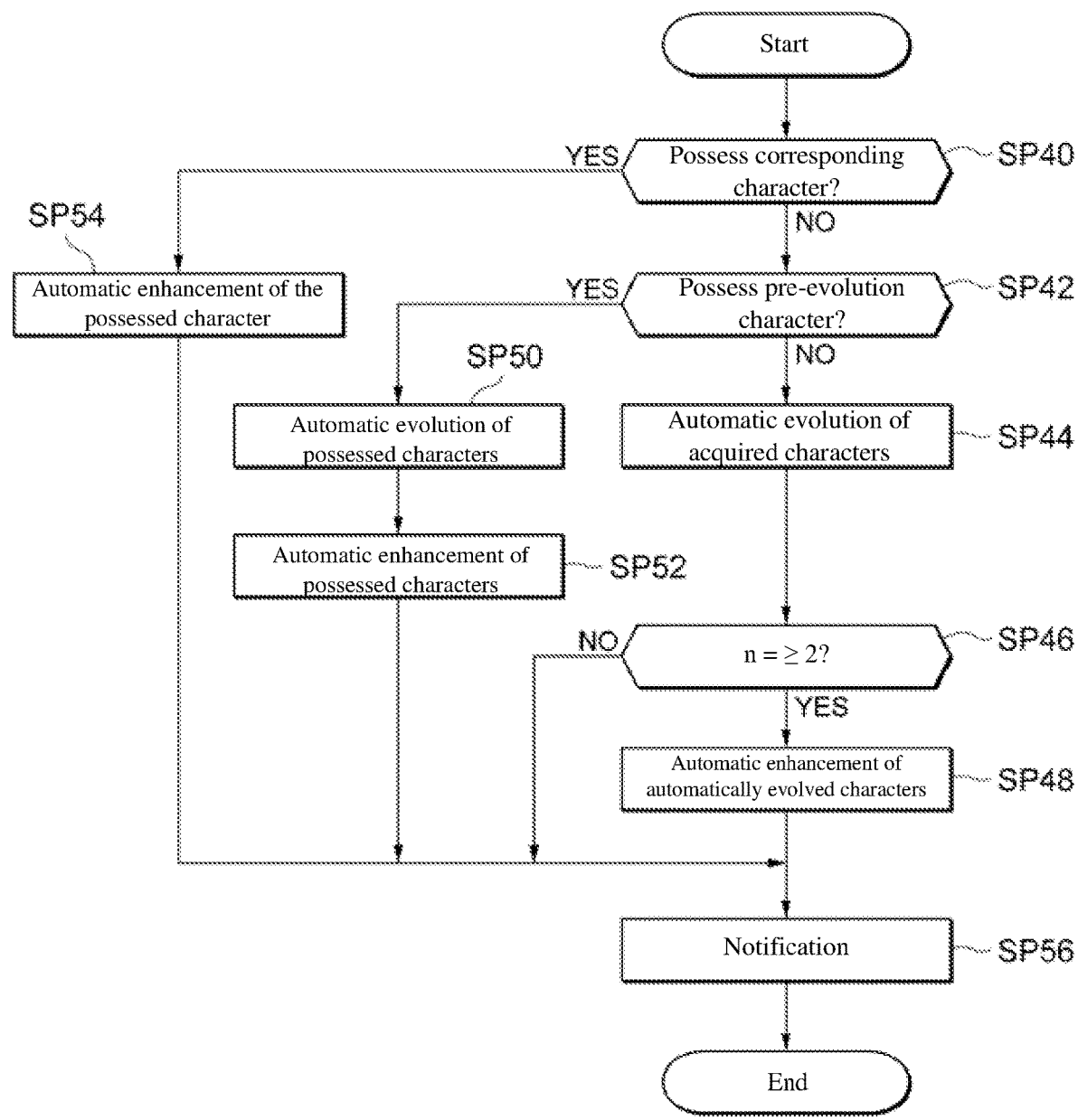
FIG. 8 is a flowchart illustrating an example of the flow of the automatic fusion process according to step SP24 (working example 2) as illustrated in FIG. 4.

FIG. 8 is a flowchart illustrating an example of the flow of the automatic fusion process according to step SP24 (Working Example 2) as illustrated in FIG. 4.

(Step SP40)

The control means 42 determines whether or not the player already possesses the corresponding character. If the determination is positive, processing moves to step SP54. On the other hand, if the determination is negative, processing moves to step SP42.

(Step SP42)

The control means 42 determines whether or not the player already owns a pre-evolution character. In one or more embodiments, the control means 42 determines whether the player owns a pre-evolution character by referring to the possessed character information in the player information 40A. If the determination is positive, processing moves to step SP50. If the determination is negative, processing moves to step SP44.

(Step SP44)

The fusion means 46 uses one pre-evolution character acquired by a player as the fusion source and fuses an evolution resource character of said pre-evolution character as a resource to automatically evolve said pre-evolution character into a corresponding character (automatic evolution fusion). In one or more embodiments, the fusion means 46 performs automatic evolution using said pre-evolution character as the fusion source and one or more evolution resource characters associated with the pre-evolution character as resources by referring to the evolution fusion information in the character information 40B.

The fusion means 46 does not perform automatic evolution if the player does not possess all of the one or more evolution resource characters associated with the pre-evolution character.

Then, processing moves to the process of step SP46.

(Step SP46)

The control means 42 determines whether the number n of acquired pre-evolution characters specified in the above step SP20 is 2 or more. If the determination is positive, processing moves to step SP48. On the other hand, if the determination is negative, processing moves to step SP56.

(Step SP48)

The fusion means 46 performs automatic enhancement (automatically enhances and fuses) by using the corresponding character that automatically evolved in the above step SP44 as the fusion source and the remaining acquired pre-evolution characters as resources. The fusion means 46 increases the skill level of one corresponding character and causes it to be a possessed character of a player and the remaining pre-evolution characters (n–1 characters) to be non-possessed characters of the player by this automatic enhancement.

If no automatic evolution is performed in the above step SP44, the fusion means 46 may, as in the above step SP34, perform automatic enhancement by using the acquired pre-evolution character as the fusion source and the remaining pre-evolution characters as resources to increase the skill level of said pre-evolution character.

Then, processing moves to step SP56.

(Step SP50)

The fusion means 46 uses one pre-evolution character already possessed by the player as the fusion source and an evolution resource character of the pre-evolution character as a resource to fuse and automatically evolve (automatically evolve and fuse) said pre-evolution character into a corresponding character. Here, if the player already possesses two or more pre-evolution characters, the fusion means 46 uses the pre-evolution character with the oldest acquisition date and time (one character) as the fusion source for the automatic evolution.

Similar to step SP44 above, the fusion means 46 does not perform automatic evolution if the player does not possess all of the one or more evolution resource characters associated with the pre-evolution character.

Then, processing moves to step SP52.

(Step SP52)

The fusion means 46 performs automatic enhancement (automatically enhances and fuses) by using the corresponding character that automatically evolved in the above step SP50 as the fusion source and all acquired pre-evolution characters as resources. The fusion means 46 increases the skill level of the automatically evolved corresponding character and causes all the acquired pre-evolution characters to be non-possessed characters of the player by this automatic enhancement.

If the automatic evolution is not performed in the above step SP50, the fusion means 46 may, as in the above step SP48, perform automatic enhancement by using a pre-evolution character that is already possessed by the player as the fusion source and all the acquired pre-evolution characters as resources to increase the skill level of said pre-evolution character.

Then, processing moves to the process of step SP56.

(Step SP54)

The fusion means 46 performs automatic enhancement (automatically enhances and fuses) by using one corresponding character already possessed by the player as the fusion source and all acquired pre-evolution characters as resources. Here, if the player possesses two or more corresponding characters, the fusion means 46 uses the corresponding character with the oldest acquisition date and time (one character) as the fusion source for the automatic enhancement. Then, processing moves to step SP56.

(Step SP56)

The control means 42 outputs (displays) to the terminal device 12 a notification screen showing the acquired pre-evolution character as well as the fact that automatic evolution and automatic enhancement have been performed.

Figure 9:
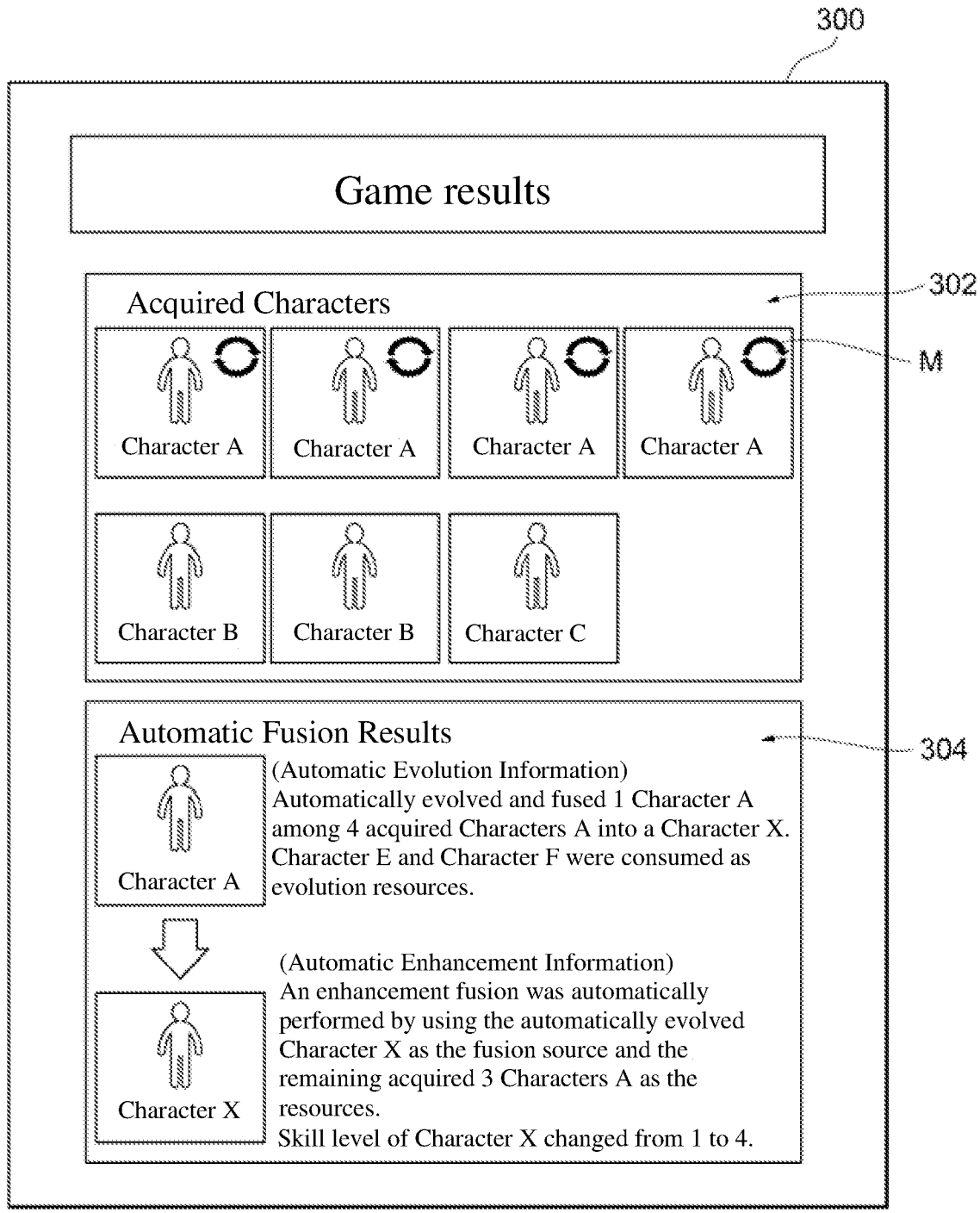
FIG. 9 is a diagram illustrating an example of a notification screen output to a terminal device (working example 2).

FIG. 9 is a diagram illustrating an example of a notification screen 300 output to the terminal device 12 (Working Example 2).

As illustrated in FIG. 9, the notification screen 300 has an acquired character information region 302 and an automatic fusion information region 304. Images of characters acquired by the player are arranged in the acquired character information region 302. The automatic fusion information region 304 shows the results of automatic evolution and automatic enhancement executed.

Here, four characters A (pre-evolution characters), two characters B, and one character C acquired by the player are arranged in the acquired character information region 302. In addition, in the acquired character information region 302, a marking M is attached to a total of four characters A that have been automatically enhanced.

In addition, the automatic fusion information region 304 shows that one of the acquired characters A was automatically evolved into a character X (corresponding character), that the automatic evolution consumed the evolution resource characters of character A, that the automatic enhancement was performed by using the automatically evolved character X as the fusion source and the remaining three characters A as resources, and, in addition, that the skill level of the character X used as the fusion source was changed (increased) by this automatic enhancement.

If the player already possessed a character A, the automatic fusion information region 304 shows the facts that one of the characters A already possessed by the player was automatically evolved into a character X, that the automatic evolution consumed the evolution resource characters, and that the automatic enhancement was performed by using the automatically evolved character X as the fusion source and all the acquired characters A as resources.

If the player already possessed a character X, the automatic fusion information region 304 shows that an automatic enhancement is performed by using the character X already possessed by the player as the fusion source and all the acquired characters A as resources.

After outputting the above notification screen 300 to the terminal device 12, processing ends the series of processes illustrated in FIG. 8.

Working Example 3

In the above-described Working Example 2, an example was given in the explanation that after the pre-evolution character was automatically evolved to a corresponding character, this automatically evolved corresponding character was automatically enhanced. However, the control means 42 may also automatically evolve the pre-evolution character after automatically enhancing the pre-evolution character.

Figure 10:
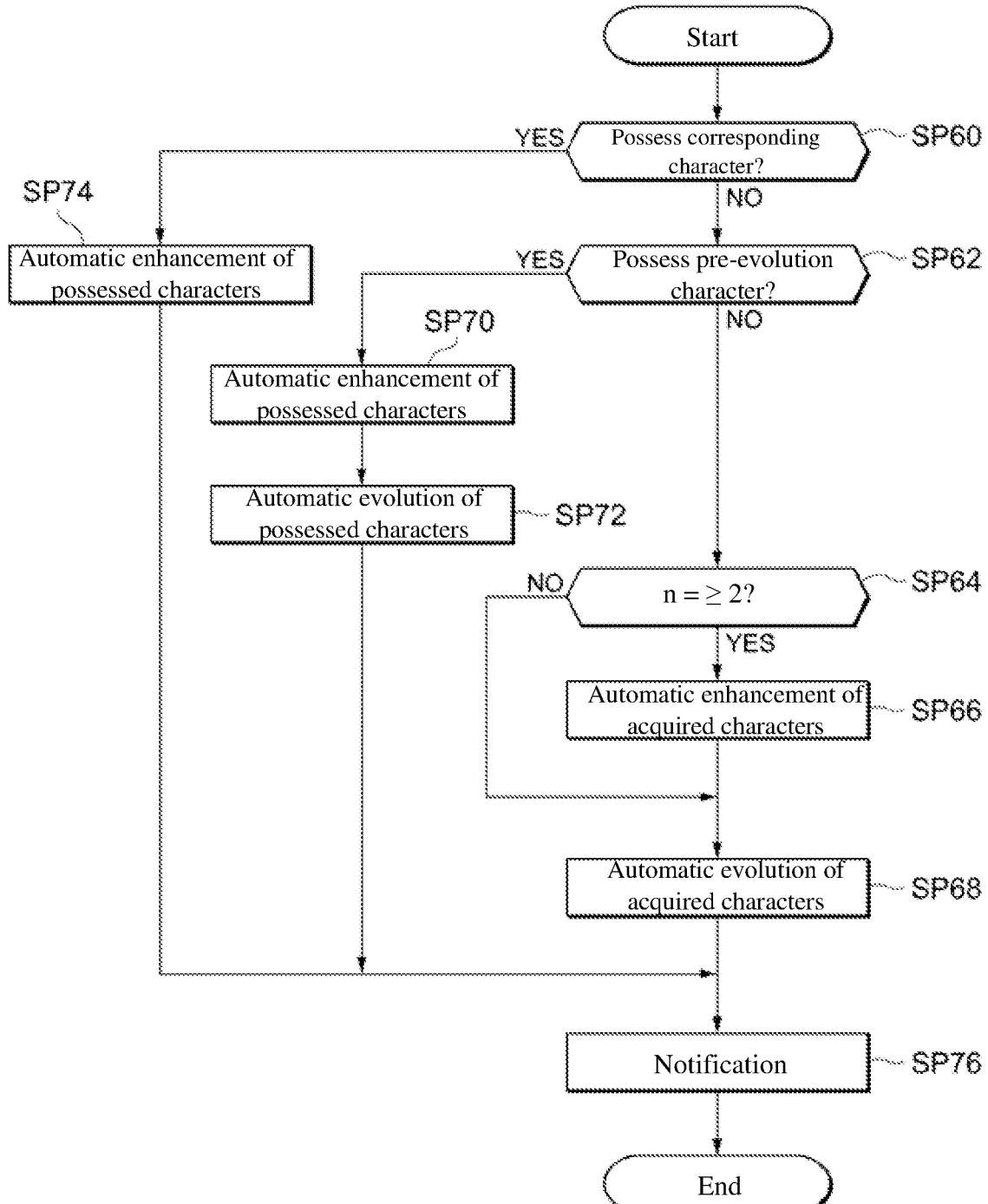
FIG. 10 is a flowchart illustrating an example of the flow of the automatic fusion process according to step SP24 (working example 3) as illustrated in FIG. 4.

FIG. 10 is a flowchart illustrating an example of the flow of the automatic fusion process according to step SP24 (Working Example 3) as illustrated in FIG. 4.

(Step SP60)

The control means 42 determines whether or not the player already possesses the corresponding character. If the determination is positive, processing moves to step SP74. If the determination is negative, processing moves to step SP62.

(Step SP62)

The control means 42 determines whether or not the player already possesses a pre-evolution character of the corresponding character. If the determination is positive, processing moves to step SP70. If the determination is negative, processing moves to step SP64.

(Step SP64)

The control means 42 determines whether the number of acquired pre-evolution characters n specified in the above step SP20 is 2 or more. If the determination is positive, processing moves to step SP66. If the determination is negative, processing moves to step SP68.

(Step SP66)

The fusion means 46 performs automatic enhancement (automatically enhances and fuses) by using a plurality of acquired pre-evolution characters among themselves. In other words, the fusion means 46 performs automatic enhancement by using one acquired pre-evolution character (one pre-evolution character) as the fusion source and the remaining pre-evolution characters (n−1 pre-evolution characters) as resources. The fusion means 46 increases the skill level of one pre-evolution character and causes it to be a possessed character of a player, and the remaining pre-evolution characters to be non-possessed characters of the player by this automatic enhancement. Processing then moves to step SP68.

(Step SP68)

If the determination is positive in the above step SP20, the fusion means 46 automatically evolves (automatically evolves and fuses) one pre-evolution character used as the fusion source by the automatic enhancement (automatic enhancement and fusion) performed in the above step SP66. On the other hand, if the determination is negative in the above step SP20, the fusion means 46 automatically evolves (automatically evolves and fuses) the acquired one pre-evolution character. In one or more embodiments, the fusion means 46 automatically evolves said pre-evolution character into a corresponding character by using said pre-evolution character as the fusion source and the evolution resource character of the pre-evolution character as a resource.

The fusion means 46 does not perform automatic evolution if the player does not possess all of one or more evolution resource characters associated with the pre-evolution character.

Then, processing moves to the process of step SP76.

(Step SP70)

The fusion means 46 performs automatic enhancement (automatically enhances and fuses) by using one pre-evolution character already possessed by a player as the fusion source and all acquired pre-evolution characters as resources. The fusion means 46 increases the skill level of one pre-evolution character and causes it to be a possessed character of the player and causes all acquired pre-evolution characters to be non-possessed characters of the player by this automatic enhancement. Processing then moves to step SP72.

(Step SP72)

The fusion means 46 automatically evolves (automatically evolves and fuses) one pre-evolution character used as the fusion source by this automatic enhancement (automatic enhancement and fusion) performed in step SP70 above. In one or more embodiments, the fusion means 46 automatically evolves (automatically evolves and fuses) said pre-evolution character into a corresponding character by using said pre-evolution character as the fusion source and the evolution resources of said pre-evolution character as resources.

Similar to step SP68 above, the fusion means 46 does not perform automatic evolution if the player does not possess all of one or more evolution resource characters associated with the pre-evolution character.

Then, processing moves to step SP76.

(Step SP74)

The fusion means 46 performs automatic enhancement by using one corresponding character already possessed by the player as the fusion source and all acquired pre-evolution characters as resources. Then, processing moves to step SP76.

(Step SP76)

The control means 42 outputs (displays) to the terminal device 12 a notification screen showing the acquired pre-evolution character as well as the fact that automatic enhancement and automatic evolution have been performed.

Figure 11:
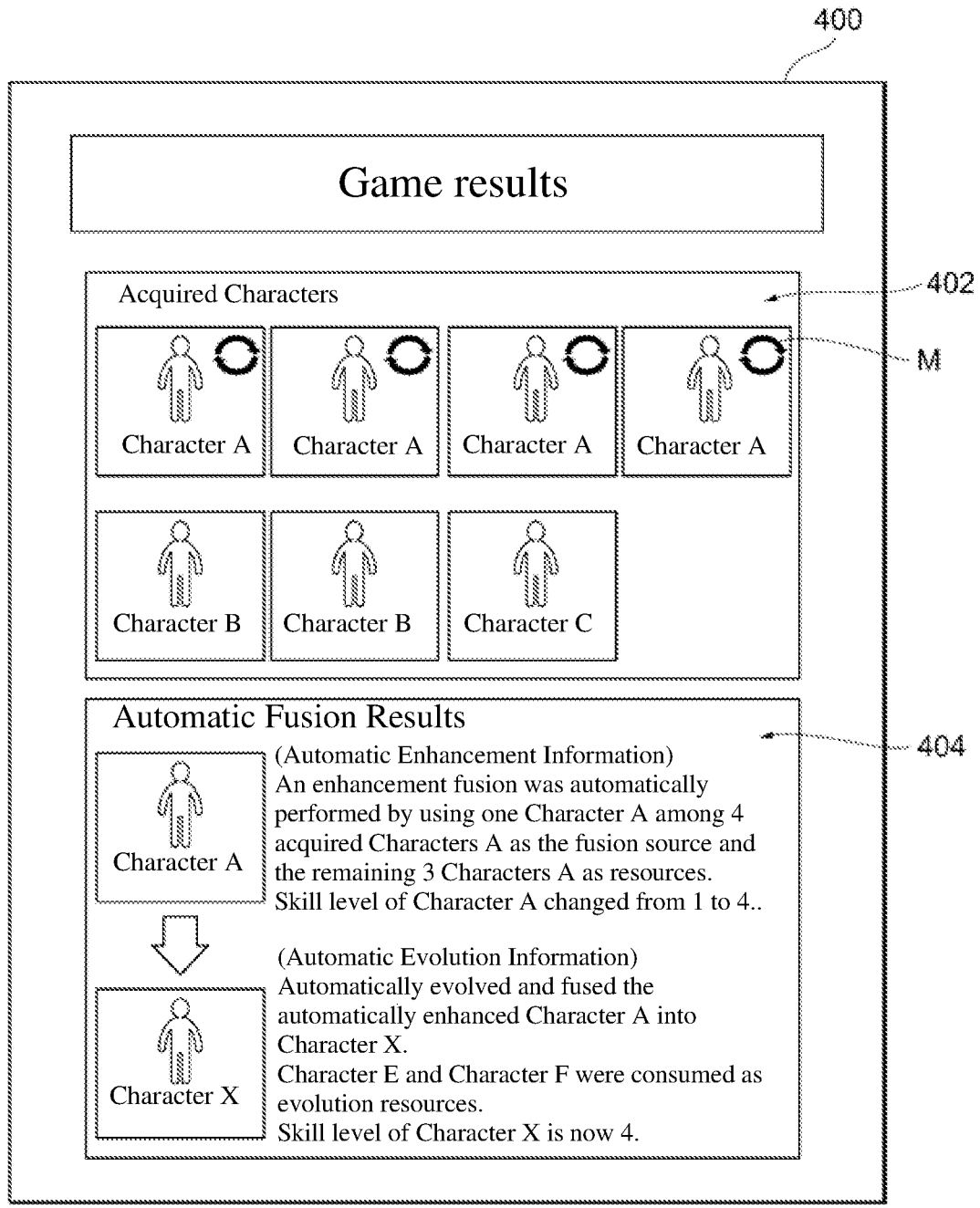
FIG. 11 is a diagram illustrating an example of a notification screen output to a terminal device (working example 3).

FIG. 11 is a diagram illustrating an example of a notification screen 400 output to the terminal device 12 (Working Example 3).

As illustrated in FIG. 11, the notification screen 400 has an acquired character information region 402 and an automatic fusion information region 404. The same information as in the acquired character information region 302 illustrated in FIG. 9 is arranged in the acquired character information region 402. The automatic fusion information region 404 shows the results of the automatic enhancement and automatic evolution performed.

Here, the automatic fusion information region 404 shows that the automatic enhancement was performed by using one of the acquired characters A (pre-evolution character) as the fusion source and the remaining three characters A as resources, that the skill level of the character A used as the fusion source was changed (increased) by this automatic enhancement, that this automatically enhanced character A was evolved into a character X (corresponding character), and that the automatic evolution consumed the evolution resource characters of character A.

If the player already possessed a character A, the automatic fusion information region 404 shows that the fact that one of the characters A has already been automatically evolved into a character X, that the automatic evolution consumed the evolution resource characters, and that the automatic enhancement was performed using this automatically evolved character X as the fusion source and all the acquired characters A as resources.

If the player already possessed a character X, the automatic fusion information region 404 shows that the player used the character X as the fusion source to perform an automatic enhancement using all the acquired characters A as resources.

After outputting the above notification screen 400 to the terminal device 12, processing ends the series of processes illustrated in FIG. 10.

Effects

According to one or more embodiments, since one of the corresponding characters among the plurality of acquired corresponding characters is automatically fused as the fusion source and the remaining corresponding characters as resources, it is possible to reduce the time and effort required for a player to go to the enhancement fusion menu after acquiring corresponding characters to enhance and fuse the corresponding characters. This can provide the player with motivation to train the corresponding character in the mission. The player can then concentrate on the game discipline of acquiring corresponding characters.

In addition, according to one or more embodiments, if the player already possesses a corresponding character, an automatic fusion is performed using the corresponding character as the fusion source and the plurality of acquired corresponding characters as resources so that the number of corresponding characters the player possesses will not increase. This reduces the time and effort required for the player to go to the enhancement fusion menu to perform an enhancement fusion of the corresponding characters.

In addition, according to one or more embodiments, if the player acquires a plurality of pre-evolution characters of a corresponding character, since one of the acquired pre-evolution characters is automatically evolved and said evolved character (corresponding character) is automatically fused using the remaining pre-evolution characters as resources, it is possible to reduce the time and effort required for the player, after acquiring pre-evolution characters, to go to the evolution fusion menu or the enhancement fusion menu to perform an evolution fusion on the pre-evolution character or to perform an enhancement fusion by using the corresponding character after the evolution fusion as the fusion source and pre-evolution characters as resources. This reduces the time and effort required for the player to train the corresponding character for the mission. The player can then concentrate on the game discipline of obtaining the pre-evolution character of the corresponding character.

In addition, according to one or more embodiments, if the player acquires a plurality of pre-evolution characters of a corresponding character, since an automatic fusion is performed using one of the pre-evolution characters as the fusion source and the remaining pre-evolution characters as resources, it is possible to reduce the time and effort required for the player, after acquiring pre-evolution characters, to go to the enhancement fusion menu to perform an enhancement fusion between the pre-evolution characters. This reduces the time and effort required for the player to train the corresponding character for the mission. The player can then concentrate on the game discipline of obtaining the pre-evolution character of the corresponding character.

In addition, according to one or more embodiments, if the player already possesses a corresponding character, since an automatic fusion is performed using the corresponding character as the fusion source and the plurality of acquired pre-evolution character as resources, the number of corresponding characters the player possesses and the pre-evolution characters of the corresponding characters will not increase. This reduces the time and effort required for the player to go to the enhancement fusion menu to perform an enhancement fusion using the corresponding character as the fusion source and the pre-evolution characters as the resources.

In addition, according to one or more embodiments, if the player already possesses a pre-evolution character, since the pre-evolution character is automatically evolved and the evolved character (corresponding character) is automatically fused using the acquired pre-evolution characters as resources, it is possible to reduce the time and effort required for the player to go to the evolution fusion menu or the enhancement fusion menu to perform an evolution fusion using the pre-evolution character or to perform an enhancement fusion using the corresponding character after the evolution fusion as the fusion source and pre-evolution characters as resources. This reduces the time and effort required for the player to train the corresponding character for the mission.

In addition, according to one or more embodiments, if the player already possesses a pre-evolution character of a corresponding character, since an automatic fusion is performed using the pre-evolution character as the fusion source and the plurality of acquired pre-evolution character as resources, the number of pre-evolution characters the player possesses will not increase. This reduces the amount of time and effort required for the player to go to the enhancement fusion menu to fuse pre-evolution characters.

In addition, according to one or more embodiments, since the pre-evolution character is automatically evolved to the corresponding character following the automatic fusion, this reduces the time and effort required for the player to go to the evolution fusion menu to perform an evolution fusion using the pre-evolution character.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, as described above, in one or more embodiments, although it is explained that the control means 42 determines whether or not a mission has been accomplished after the automatic fusion process, the control means 42 may determine whether or not a mission has been accomplished by a player when the player selects the mission menu. For example, the control means 42 outputs the mission menu to the terminal device 12 with a mixture of accomplished and unaccomplished missions. Furthermore, the granting means 44 may, when an accomplished mission is selected by the player, grant the player a mission reward corresponding to the selected accomplished mission.

As described above, in one or more embodiments, the control means 42 may allow the player to acquire a mixture of the corresponding character and characters in the same family as the corresponding character (pre-evolution characters and post-evolution character of the corresponding character) by advancing the game discipline (quest or lottery game).

The control means 42 may also specify, in the above step SP16, the game discipline in which the player is to acquire the post-evolution character of the corresponding character. In this case, when the player acquires a post-evolution character, the fusion means 46 may automatically degenerate the post-evolution character into the corresponding character.

In one or more embodiments described above, the fusion means 46 performs the evolution fusion on the condition that the player possesses all the evolution resource characters associated with the fusion source character (the pre-evolution character), but an additional condition can be added to the evolution fusion to require the fusion source character to be at the maximum level. In this case, when the fusion means 46 automatically evolves the pre-evolution character in step SP24 described above, the fusion means 46 may automatically evolve the pre-evolution character after performing an automatic enhancement in order to increase the level of the pre-evolution character to the maximum value.

In one or more embodiments described above, it is explained that the fusion means 46 changes (increases) the skill level of the fusion source character by fusing the fusion source character using characters of the same family as resources. However, the amount of skill level change (increase) can also be determined based on the number and skill level of the same-family characters that are the resources. For example, the fusion means 46 may increase the skill level of the fusion source character by 1 for each same-family character that is a resource, or may increase the skill level of the fusion source character by 5 when the skill level for respective same-family characters that are the resources totals 5. The fusion means 46 may randomly determine the amount by which the skill level of the fusion source character is increased according to the number of same-family characters that are the resources or according to the total skill level.

The fusion means 46 may change (increase) the skill level of the fusion source character even when the fusion source character is enhanced and fused using a special character that is not in the same family as the fusion source character as a resource. In this case, for example, the control means 42 may specify the game discipline in which the special character can be acquired in step SP16 described above, and in step SP24 described above, the fusion means 46 may perform an automatic enhancement by using a corresponding character or pre-evolution character that the player already possess as the fusion source and the acquired special character as resource.

Also, the fusion means 46 may change (increase) the skill level of the fusion source character by performing an enhancement fusion using, as resources, characters that have the same skill as the fusion source character, characters that have the same attributes as the fusion source character, characters that are set with the same rarity as the fusion source character, and the like.

In addition, in one or more embodiments described above, in step SP36 and step SP50 described above, it was explained that the fusion means 46 automatically enhances the oldest corresponding character (one character) as the fusion source when the player already possesses two or more corresponding characters. However, an automatic enhancement may be performed where the oldest corresponding character is used as the fusion source and the remaining already-possessed corresponding characters are used as resources.

In addition, when the skill level of the corresponding character that is the fusion source exceeds the attainment level of the mission through automatic enhancement, the fusion means 46 may reduce the number of corresponding characters (n or n−1) used as resources for the automatic enhancement so that the skill level does not exceed the attainment level. In this case, the fusion means 46 sets the corresponding character that was not used as a resource for automatic enhancement as a possessed character of the player.

In addition, in one or more embodiments described above, it is explained that the fusion means 46 performs the automatic fusion process in step SP24 described above based on a mission challenge instruction (or, through a challenge instruction) from the player in step SP14 described above. However, if there was no mission challenge instruction, the automatic fusion process is not performed even if the player acquires the corresponding characters or pre-evolution characters for the mission. However, the fusion means 46 may perform the automatic fusion process if the player has set in the settings or the like to automatically fuse corresponding characters or pre-evolution characters for each mission regardless of mission challenge instructions.

The fusion means 46 may continue the automatic fusion process without going through a mission challenge instruction when a player acquires a corresponding character or a pre-evolution character for a mission for which a challenge instruction was given in the past. Note that the fusion means 46 can be set not to continue (to cancel) this automatic fusion process if the player accomplishes the mission, the skill levels of corresponding characters or pre-evolution characters reach their maximum level, the player gives an instruction to drop the mission challenge, or the mission becomes impossible to execute.

Also, the fusion means 46 may set (register) the corresponding character or its pre-evolution character for the mission as the fusion source character for automatic fusion based on a mission challenge instruction from the player. For example, if a character possessed by a player is set (registered) as the fusion source character for automatic fusion, when the player acquires a character of the same family as the character, the fusion means 46 performs an automatic enhancement (automatically enhances and fuses) using the character as the fusion source and the acquired same-family character as the resource.

In one or more embodiments described above, the skill level is described as an example of a parameter, but parameters can also include, for example, the number of times a character's maximum level has been reached, the number of awakened skills, luck, and the like.

In addition, in one or more embodiments described above, it was explained that mission contents include causing the parameters of corresponding characters to reach a predetermined value. However, mission contents can also include missions for completing specific quests, missions for reaching a predetermined number of days logged in, missions for responding to a survey, missions for preparing a plurality of characters of which parameters have reached their upper limit, missions for reaching a predetermined level of total consumed stamina, and the like.

In addition, in one or more embodiments described above, characters are mainly used as an example of content. However, items, cards, avatars, coins, points, and the like can also be used.

10 Server device (information processing device)
12 Terminal device (computer)
14 Game program (program)
42 Control means
44 Granting means
46 Fusion means

The invention claimed is:

1. A game system, comprising:
a server device that comprises a storage and a controller connected to the storage; and
a terminal device that is connected to the server device via a network and comprises a graphical user interface (GUI), wherein
the storage stores:
  contents owned by a player, wherein each of the contents has a content ID and a parameter; and
  a mission associated with a first content of the contents, and
the controller:
  executes a game in which a parameter of a source content is increased when the source content having a source content ID is fused with a resource content having a resource content ID that is a same as the source content ID;
  upon receiving an instruction for the mission based on a player's operation in the GUI, causes the terminal device to display a game discipline in which the first content can be acquired by the player;
  when two or more first contents are acquired in the game disciplines, determines:
    a second content of the acquired first contents as the source content; and
    third contents of the acquired first contents as the resource contents;
  automatically fuses the second content with the third contents; and
  creates and outputs, to the terminal device via the network, a notification screen showing the acquired first contents and a result in which the second content is automatically fused with the third contents, and then causes the terminal device to display the notification screen.

2. The game system according to claim 1, wherein the controller further:
determines whether a parameter of the first content reaches a predetermined value; and
causes the storage to store a reward to be granted to the player if the controller determines that the parameter of the first content reaches the predetermined value.

3. The game system according to claim 1, wherein
when the storage stores the first content as a content owned by the player before the game discipline is played by the player, the controller causes the terminal device to display a result in which the stored first content is automatically fused with the third contents.

4. A game system, comprising:
a server device that comprises a storage and a controller connected to the storage; and
a terminal device that is connected to the server device via a network and comprises a graphical user interface (GUI), wherein
the storage stores:
  contents owned by a player, wherein each of the contents has a content ID and a parameter; and
  a mission associated with a first content of the contents, and
the controller:
  executes a game in which a parameter of a source content is increased when the source content having a source content ID is fused with a resource content having a resource content ID, wherein the source content ID and the resource content ID are associated with a same family ID;
  upon receiving an instruction for the mission based on a player's operation in the GUI, causes the terminal device to display a game discipline in which a pre-evolution content that is to be evolved into the first content can be acquired by the player;
  when two or more pre-evolution contents are acquired in the game disciplines,
    evolves one of the acquired pre-evolution contents into the first content; and
    determines the evolved first content as the source content and third contents of the acquired pre-evolution contents as the resource contents;
  automatically fuses the evolved first content with the third contents; and
  creates and outputs, to the terminal device via the network, a notification screen showing the acquired pre-evolution contents and a result in which the evolved first content is automatically fused with the third contents, and then causes the terminal device to display the notification screen.

5. The game system according to claim 4, wherein the controller further:
determines whether a parameter of the first content reaches a predetermined value; and
causes the storage to store a reward to be granted to the player if the controller determines that the parameter of the first content reaches the predetermined value.

6. The game system according to claim 4, wherein
when the storage stores the first content as a content owned by the player before the game discipline is played by the player, the controller causes the terminal device to display a result in which the stored first content is automatically fused with the third contents.

7. The game system according to claim 4, wherein
when the storage stores the pre-evolution content as a content owned by the player before the game discipline is played by the player, the controller determines to evolve the stored pre-evolution content into the first content, and
the controller causes the terminal device to display the result in which the evolved first content is automatically fused with the third contents.

8. A game system, comprising:
a server device that comprises a storage and a controller connected to the storage; and
a terminal device that is connected to the server device via a network and comprises a graphical user interface (GUI), wherein
the storage stores:
  contents owned by a player, wherein each of the contents has a content ID and a parameter; and
  a mission associated with a first content of the contents, and
the controller:
  executes a game in which a parameter of a source content is increased when the source content having a source content ID is fused with a resource content having a resource content ID, wherein the source content ID and the resource content ID are associated with a same family ID;

upon receiving an instruction for the mission based on a player's operation in the GUI, causes the terminal device to display a game discipline in which a pre-evolution content that is to be evolved into the first content can be acquired by the player;

when two or more pre-evolution contents are acquired in the game disciplines, determines a second content of the acquired pre-evolution as the source content and third contents of the acquired pre-evolution contents as the resource contents; and automatically fuses the second content with the third contents; and creates and outputs, to the terminal device via the network, a notification screen showing the acquired pre-evolution contents and a result in which the second content is automatically fused with the third contents, and then causes the terminal device to display the notification screen.

9. The game system according to claim 8, wherein the controller further:
   determines whether a parameter of the first content reaches a predetermined value; and
   causes the storage to store a reward to be granted to the player if the controller determines that the parameter of the first content reaches the predetermined value.

10. The game system according to claim 8, wherein
    when the storage stores the first content as a content owned by the player before the game discipline is played by the player, the controller causes the terminal device to display a result in which the stored first content is automatically fused with the third contents.

11. The game system according to claim 8, wherein
    when the storage stores the pre-evolution content as a content owned by the player before the game discipline is played by the player, the controller determines to evolve the stored pre-evolution content into the first content, and
    the controller causes the terminal device to display a result in which the evolved first content is automatically fused with the third contents.

* * * * *